Sept. 8, 1931. G. W. VEALE ET AL 1,822,717
BUMPER CONSTRUCTION
Filed May 3, 1930
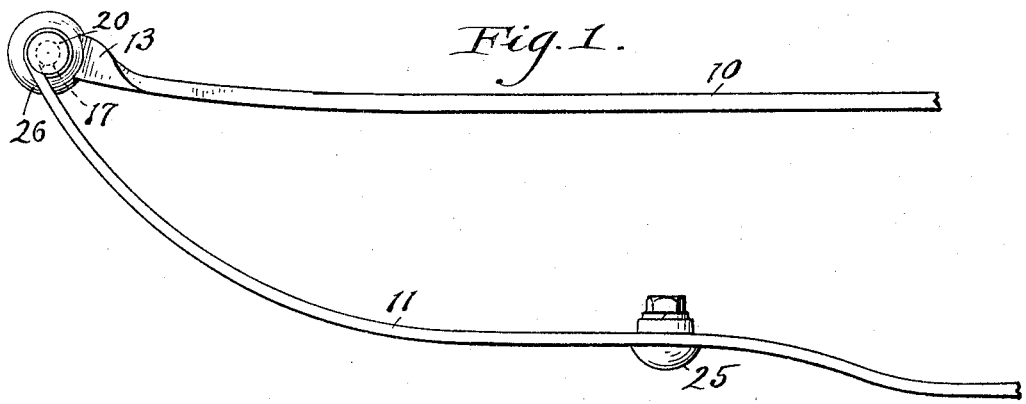
Fig. 1.
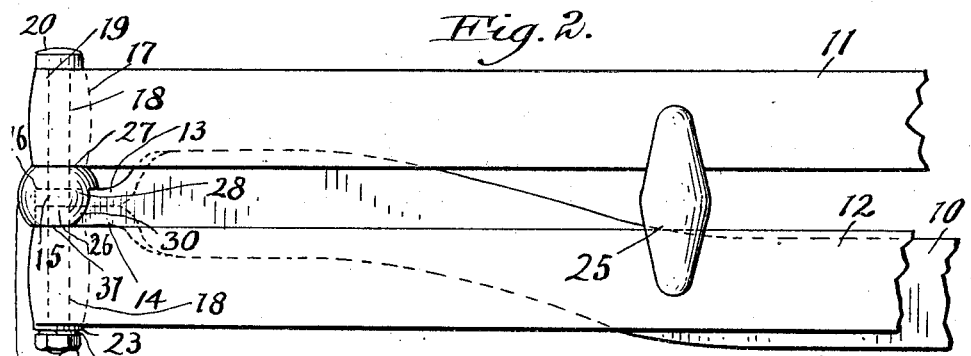
Fig. 2.
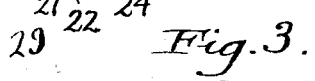
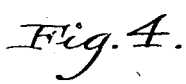
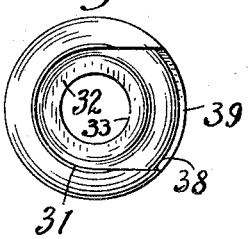
Fig. 3. Fig. 4. Fig. 5.
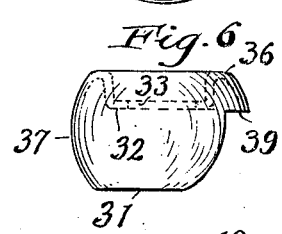
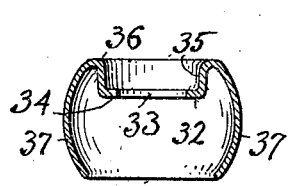
Fig. 6. Fig. 7.
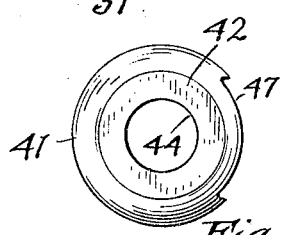
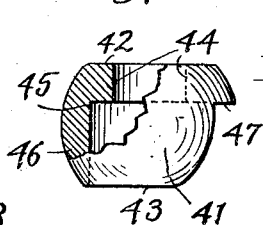
Fig. 8. Fig. 9.
Inventors.
George W. Veale
Edward H. Lindeman
Kwis Hudson & Kent
attys Patented Sept. 8, 1931

1,822,717

UNITED STATES PATENT OFFICE

GEORGE W. VEALE, OF CLEVELAND, AND EDWARD H. LINDEMAN, OF CLEVELAND HEIGHTS, OHIO, ASSIGNORS TO THE EATON AXLE & SPRING COMPANY, OF CLEVELAND, OHIO, A CORPORATION OF OHIO

BUMPER CONSTRUCTION

Application filed May 3, 1930. Serial No. 449,405.

This invention relates to bumper constructions for automotive vehicles, of the type having joints between impact bars and support bars, and more particularly to means for spacing the parts or for concealing the end of the support bar, or both.

It is an object of the invention to provide a spacer element adapted to separate the bars of a bumper, and to form a cover for the end of a supporting bar.

It is another object of the invention to provide a device of the character described which will be simple and inexpensive to manufacture, and well adapted for the purpose set forth.

Other objects and features of novelty will be apparent as the following description proceeds, as taken in conjunction with the accompanying drawings, in which:

Figure 1 is a partial top plan view of a bumper of the double impact bar type for automotive vehicles having the spacer and cover element assembled therewith.

Fig. 2 is a front elevation of the structure shown in Fig. 1.

Figs. 3 to 7, inclusive, are details of the spacer element according to the preferred embodiment of the invention. Fig. 3 is a top plan, Fig. 4, an elevation, Fig. 5 a bottom plan, Fig. 6 a side elevation, and Fig. 7 is a central vertical cross section.

Figs. 8 and 9 illustrate a modified construction which may be formed from a casting. Fig. 8 is a top plan view and Fig. 9 is an elevation, shown partly in section.

Referring more particularly to the drawings, the invention is illustrated in connection with a bumper of the double impact bar type for automotive vehicles, although the invention is not to be limited to this type of bumper. The bumper comprises a support bar 10 adapted to be attached to the supporting brackets of the automotive vehicle upon which the bumper is mounted. A pair of impact bars 11 and 12 having a vertically convex outer surface are supported by the bar 10, the ends of the bars 11 and 12 being respectively connected to the ends of the bar 10 and generally convexed horizontally outward therebetween. The end of the bar 10 has upper and lower portions folded rearwardly about a central line, forming two superposed flat flanges 13 and 14. The supporting end thus formed is centrally punched as at 15, and the outer edges thereof are preferably rounded concentric with the bore 15, the rounded portion being indicated at 16.

The ends of the bars 11 and 12 are each rolled to form an eye 17 having a bore 18, and a pintle bolt 19 passes through the bore 18 of the upper bar, the bore 15 and the bore 18 of the lower bar. The bolt 19 is provided with a finished head 20 and a threaded end 21 which receives a nut 22, washer 23 and lock washer 24. The intermediate portions of the bars 11 and 12 are held in spaced relation by a spacer clamp 25.

The structure described above is known in the art, and forms no part of the present invention other than in combination with the structure now to be described. Means are provided for spacing the ends of the bars 11 and 12, and for concealing the outer end of the supporting bar 10. Accordingly, an element indicated generally at 26 is provided with an upper external bearing surface 27 and an internal bearing surface 28 parallel thereto and spaced therefrom. This member also comprises a skirt 29 depending below the surface 28 and forming an enclosure therefor. The skirt 29 is slotted, as at 30, to permit the end of the bar 10 to be inserted laterally therein, so that the upper surface of the flange 13 may engage the internal bearing surface 28.

The depth of the member 26 is greater than the combined depth of the flanges 13 and 14, so that the end of the bar 10 is held in spaced relation from the upper bar 11. The slot 30 is of the same depth as the end of the bar 10 so that the lower edge 31 of the member 26 meets the upper edge of the end of the bar 12, thus forming a symmetrical finish for the bumper at this joint. As portions of the bars 11 and 12 are generally electro-plated with nickel or chromium, the exposed surfaces of the member 26 are also preferably plated in the same manner so as to provide a uniform finish. It will be noted that the member 26, in addition to spacing the bars 11 and 12, also serves to conceal the ends 13 and 14, forming a pleasing finish for the bumper.

The member 26 is preferably formed of sheet metal as shown in Figs. 3 to 7, inclusive. Accordingly, a boss 32 is pressed into the metal and provided with a central aperture 33 to receive the bolt 18. This boss comprises a radial flange 34 adapted to form the seat 28, an annular flange 35, and a smoothly rounded circular edge 36 adapted to form the bearing surface 27. These operations are preferably performed upon a circular sheet metal blank, the surrounding portions of which are pressed or bent annularly in the direction in which the boss 32 was pressed, thus forming a cup 37 enclosing the boss 32. When a circular curvature is given to the cup 37, this operation results in an article having the appearance of a sphere flattened at each end.

A lateral rectangular slot 38 is cut in one side of the cup 37, the top edge 39 of the slot being substantially aligned with the bottom of the boss 32 so as to permit the end of the support bar 10 to pass into the interior of the cup 37, with the upper surface of the flange 13 bearing against the flange 34. The cup 37 extends down thereover, with its lower edge forming the seating surface 31.

The spacer element may be a casting, as shown in Figs. 8 and 9. The casting has an ornamental exterior, such as a spherical surface 41. The top and bottom of the casting are flat, as at 42 and 43 respectively. The casting has a central passage 44, with a diameter to receive the bolt 18 and a larger, continued and concentric passage 45, to receive the rounded end 16. These surfaces will define the depending skirt 46, and a rectangular slot 47 is formed in one side thereof to receive the end 13. In this arrangement the shoulder between the passages 44 and 45 forms the seating surface 28, the flat top 42 forms the seating surface 27 and the edge 43 forms the seating surface 31.

While two embodiments of the invention have been illustrated and described in great detail for the purposes of adequate disclosure, the broad idea of the invention is not limited to any of the details disclosed, but instead includes such embodiments thereof as fall within the scope of the appended claims.

Having thus described our invention, what we claim is:

1. In a bumper for automotive vehicles, a combined spacer and cover element having a portion forming internal and external seats surrounding a central aperture, a skirt portion extending therefrom and concealing said internal seat, said skirt portion having a slot forming a transverse recess extending into said element, an edge of said slot being substantially aligned with said internal seat.

2. As a new article of manufacture, a hollow sheet metal member having an internal, centrally apertured boss pressed therein, the material surrounding said boss being formed into an enclosure for said boss, and the side of said enclosure being slotted, forming an edge substantially aligned with the inner face of said boss.

3. In a bumper, the combination of a pair of spaced impact bars, a supporting member having an apertured portion disposed between said impact bars, means connecting said impact bars and extending through said apertured portion, and a combined spacing and concealing element interposed between said impact bars to hold the latter in spaced relation, said element having a concealing recess into which said apertured portion extends.

4. In a bumper, the combination of a pair of spaced impact bars, a supporting member having an apertured portion disposed between said impact bars, a combined spacing and concealing element interposed between said impact bars to hold the latter in spaced relation, and means connecting said impact bars and extending through said element and said apertured portion, said element being provided with a laterally accessible concealing recess into which said apertured portion extends.

In testimony whereof, we hereunto affix our signatures.

GEORGE W. VEALE.
EDWARD H. LINDEMAN.